United States Patent Office 3,431,257
Patented Mar. 4, 1969

3,431,257
BASICALLY SUBSTITUTED DERIVATIVES OF 5,6-DIHYDRO - DIBENZO - [b,e] - AZEPINE - 6,11-DIONE-11-OXIME
Gerd Aichinger, Wuppertal-Vohwinkel, and Siegismund Schutz and Friedrich Hoffmeister, Wuppertal-Elberfeld, Germany, assignors to Farbenfabriken Bayer Aktiengesellschaft, Leverkusen, Germany, a corporation of Germany
No Drawing. Filed Sept. 6, 1966, Ser. No. 577,157
Claims priority, application Germany, Sept. 10, 1965, F 47,146
U.S. Cl. 260—239.3   17 Claims
Int. Cl. C07d *53/04, 53/06;* A61k *27/00*

ABSTRACT OF THE DISCLOSURE

There are provided new basically substituted derivatives of 5,6-dihydro-dibenzo-[b,e]-azepine-6,11-dione-11-oxime which are useful for their antidepressive activity and for the potentiation of the effect of noradrenalin and adrenalin on the central nervous system. The compounds have the formula:

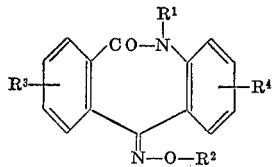

wherein $R^1$ is hydrogen, alkyl of 1 to 4 carbon atoms or a basically substituted alkyl radical —$A^1B^1$, $R^2$ is hydrogen, alkyl of 1 to 4 carbon atoms or a basically substituted alkyl radical —$A^2B^2$, $R^1$ and $R^2$ not being both simultaneously hydrogen and at least one of $R^1$ and $R^2$ being a said basic alkyl radical, $R^3$ and $R^4$ are each hydrogen, halogen, alkyl of 1 to 4 carbon atoms or alkoxy of 1 to 4 carbon atoms, and —$A^1B^1$ and —$A^2B^2$ are identical or different in which $A^1$ and $A^2$ are each branched or straight alkylene of 1 to 6 carbon atoms and $B^1$ and $B^2$ are each selected from the group consisting of alkylamino, dialkylamino, pyrrolidino, piperidino, hexamethylene-imino, morpholino, thiomorpholino, N-alkylpiperazino and N-(2-hydroxyalkyl)-piperazino, of which alkyl has 1 to 6 carbon atoms.

---

Basically substituted derivatives of 5,6-dihydrodibenzo-[b,e]-azepine [see e.g. J. Med. Chem 8, (1965) and the references there given] are known and have been examined with a view to a possible psychotropic effect.

The compounds of the present invention, namely basically substituted derivatives of 5,6-dihydro-dibenzo-[b,e]-azepine-6,11-dione-11-oxime, however, have hitherto not been known.

It has now been found that derivatives of 5,6-dihydrodibenzo-[b,e]-azepine-6,11-dione-11-oxime of the formula:

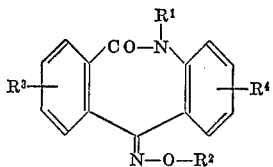

have remarkable pharmacodynamic properties.

In the above Formula I, $R^1$ is hydrogen, alkyl of 1-4 carbon atoms or a basically substituted alkyl radical —$A^1B^1$; $R^2$ is hydrogen, alkyl of 1-4 carbon atoms or a basically substituted alkyl radical —$A^2B^2$, with the proviso that $R^1$ and $R^2$ cannot both simultaneously be hydrogen and that at least one of $R^1$ and $R^2$ must be a basic alkyl radical; $R^3$ and $R^4$ are hydrogen, halogen, alkyl of 1-4 carbon atoms or alkoxy of 1-4 carbon atoms; the basically substituted alkyl radical —$A^1B^1$ and —$A^2B^2$ can be identical or different: $A^1$ and $A^2$ are each a branched or straight alkylene chain of 1-6 carbon atoms and $B^1$ and $B^2$ are each a basic group, such as an alkylamino, dialkylamino, pyrrolidino, piperidino, hexamethylene-imino, morpholino, thiomorpholino, N-alkylpiperazino or N-(2-hydroxyalkyl)-piperazino group.

The compounds of the Formula I can be prepared according to known types of processes as follows:

(a) 5,6 - dihydro-dibenzo-[b,e]-azepine-6,11-diones of the formula:

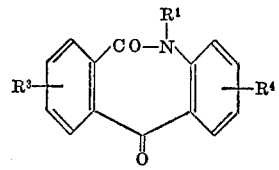
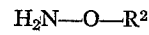

in which $R^1$, $R^3$ and $R^4$ have the same meaning as above, are reacted with hydroxylamines of the formula:

$$H_2N—O—R^2 \qquad III$$

in which $R^2$ has the same meaning as above, or (b) 5,6 - dihydro - dibenzo-[b,e]-azepine-6,11 - dione-11-oximes of the formula:

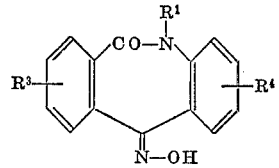

in which $R^1$, $R^3$ and $R^4$ have the same meaning as above, are reacted with reactive esters of alkanols or hydroxyalkylamines of the formula:

$$X—R^2 \qquad V$$

in which X is the radical of a reactive ester, like a halogen atom or the radical of a sulphuric acid or sulphonic acid ester, such as the radical of p-toluene-sulphonic acid, and $R^2$ is alkyl of 1–4 carbon atoms or a basically substituted alkyl group —$A^2B^2$, wherein $A^2$ and $B^2$ have the same meaning as above, or (c) 5,6 - dihydro-dibenzo - [b,e]-azepine-6-11-dione-11-oximes of the formula:

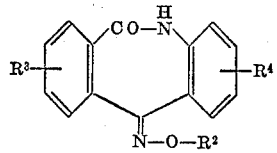

in which $R^2$ is alkyl of 1–4 carbon atoms or a basically substituted alkyl group —$A^2B^2$, wherein $A^2$ and $B^2$ have the same meaning as above, and $R^3$ and $R^4$ have the same meaning as above, are reacted with reactive esters of alkanols or hydroxyalkylamines of the formula:

X—R¹   VII in which X has the meaning given under (b) and R¹ is alkyl of 1–4 carbon atoms or a bascially substituted alkyl group —A¹B¹ wherein A¹ and B¹ have the same meaning as above, or (d) Finally, compounds of the Formula I in which R¹=R²=R¹,² can also be prepared in such a manner that 5,6-dihydrodibenzo-[b,e]-azepine-6,11-dione-11-oximes of the formula:

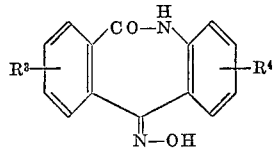

in which R³ and R⁴ have the same meaning as above, are reacted with reactive esters of hydroxyalkyl-amines of the formula:

X—R¹,²   IX in which X has the meaning given under (b) and R¹,² is a basically substituted alkyl group —A¹,²B¹,² wherein A¹,² has the meaning given above for A¹ or A² and B¹,² has the meaning given above for B¹ or B².

The oximation described under (a) can be carried out with the free hydroxylamines or with the salts of these hydroxylamines, for example, the hydrochlorides. Alcohols and/or pyridine are preferably used as solvents. The alkylation on the oxime oxygen described under (b) is preferably carried out in alcohols in the presence of one equivalent of alkali metal alcoholate. For the alkylation on the amide nitrogen described under (c) it is advantageous to convert the lactams into their alkali metal salts by treatment with alkaline agents, such as sodium amide, sodium hydride, sodium or potassium alcoholates or potassium carbonate in inert solvents, and then to react the salts with the reactive esters of the alkanols or hydroxyalkyl-amines. As inert solvents there are preferably used aliphatic, alicyclic and aromatic hydrocarbons or aliphatic, alicyclic and aliphatic-aromatic ethers, such as diethyl ether, tetrahydrofuran, dioxan or anisole. The simultaneous alkylation on the oxime oxygen and the amide nitrogen described under (d) is carried out in basically the same manner. In general, the reactions are carried out by heating under reflux for several hours.

The invention also comprises the production of pharmacologically compatible salts of the dibenzo-azepine-dione-oximes of the Formula I with inorganic acids, such as hydrochloric acid, hydrobromic acid, sulphuric acid or phosphoric acid, and with organic acids such as lactic acid, maleic acid, tartaric acid or citric acid.

In animal tests the compounds of the invention exhibit a strong anticataleptic and a centrally and peripherally anticholinergic action. They increase the effect of noradrenalin and adrenalin and are characterized by their effects on the central nervous system as strongly effective antidepressive agents.

The invention is illustrated by the following nonlimitative examples.

EXAMPLE 1

1 gram (0.0435 gram atom) of sodium is dissolved in 150 ml. of ethanol, 9.9 g. (0.0415 mol) of 5,6-dihydro-dibenzo-[b,e]-azepine-6,11-dione-11-oxime added, the reaction mixture heated to boiling temperature and 5.9 g. (0.0435 mol) of 2-diethylaminoethyl chloride added dropwise while stirring. The reaction mixture is boiled under reflux overnight, the solvent is then distilled off in a vacuum and the residue stirred with water and ether. The ether phase is separated, dried over sodium sulphate and evaporated. The residue crystallizes and can be recrystallized from a little ether. The 5,6-dihydro-11-(2-diethyl-amino-ethoximino)-dibenzo-[b,e]-azepine-6-one melts at 143° C. (Kofler block).

$C_{20}H_{23}N_3O_2$ (337.4): Calc. C, 71.19; H, 6.87; N, 12.45. Found C, 70.73; H, 6.92; N, 12.24.

The hydrochloride can be prepared in acetone by the addition of ethereal hydrochloric acid; M.P. (methanol/acetone) 230–232° C. (decomposition).

$C_{20}H_{23}N_3O_2 \cdot HCl$ (373.9);Calc. N, 11.24; Cl⁻, 9.48. Found N, 11.30; Cl⁻, 9.58.

The following compounds are also prepared in similar manner:

(a) 5,6-dihydro -11- (2-dimethylamino-ethoximino)-dibenzo - [b,e] - azepine - 6 - one of M.P. 160° (Kofler block). $C_{18}H_{19}N_3O_2$ (345.8): Calc. C, 69.88; H, 6.19; N, 13.58. Found: C, 70.30; H, 6.18; N, 13.31. M.P. of the hydrochloride (methanol/acetone) 186–189° C.

(b) 5,6-dihydro-11 - (2-piperidino - ethoximino) - dibenzo-[b,e]-azepine-6-one of M.P. (ether/petroleum ether) 161–162° C. $C_{21}H_{23}N_3O_2$ (349.4): Calc. C, 72.18; H, 6.63; N, 12.03. Found: C, 72.21; H,6.59; N, 11.66. M.P. of the hydrochloride (methanol/acetone) 244–247° C. (decomposition).

(c) 5,6-dihydro-11-(3-dimethylamino - propoximino)-dibenzo-[b,e]-azepine-6-one; M.P. of the hydrochloride (methanol/ether) 250–253° C. (decomposition).

$C_{19}H_{21}N_3O_2 \cdot HCl$ (359.9): Calc. C, 63.41; H, 6.16; N, 11.68; Cl⁻, 9.85. Found C, 63.33; H, 6.29; N, 11.40; Cl⁻, 9.88.

(d) 11 - (2 - methyl - 3 - dimethylamino-propoximino)-5,6-dihydro-dibenzo-[b,e]-azepine-6-one; M.P. of the hydrochloride (acetone) 197–200° C. $C_{20}H_{23}N_3O_2 \cdot HCl$ (373.9): Calc. N, 11.24; Cl⁻, 9.48. Found: N, 11.23; Cl⁻, 9.56.

(e) 11 - (2 - morpholino-ethoximino) - 5,6 - dihydro-dibenzo-[b,e]-azepine-6-one; M.P. (methanol) 190° C. (Kofler block); melting point of the hydrochloride (methanol/ether) 265–267° C. (decomposition).

$C_{20}H_{21}N_3O_3 \cdot HCl$ (387.9): Calc. N, 10.83; Cl⁻, 9.14. Found: N, 10.35; Cl⁻, 9.12.

(f) 11 - (3 - morpholino-propoximino) - 5,6 - dihydro-dibenzo-[b,e]-azepine-6-one, M.P. 145° C. (Kofler block); melting point of the hydrochloride 254–256° C. (decomposition). $C_{21}H_{23}N_3O_3 \cdot HCl$ (401.9): Calc. N, 10.46; Cl⁻, 8.82. Found: N, 10.41; Cl⁻, 8.86.

(g) Starting from 3-methyl-5,6-dihydro-dibenzo-[b,e]-azepine-6,11-dione-11-oxime: 3-methyl - 11 - (2-diethyl-amino-ethoximino)-5,6-dihydro-dibenzo - [b,e] - azepine-6-one, M.P. 160° C. (Kofler block); melting point of the hydrochloride 221–225° C. (decomposition).

$C_{21}H_{25}N_3O_2 \cdot HCl$ (387.9): Calc. N, 10.83; Cl⁻, 9.14. Found: N, 10.64; Cl⁻, 9.22.

(h) Starting from 1-methoxy-5, 6-dihydro-dibenzo-[b,e]-azepine-6,11-dione-11-oxime: 1-methoxy-11-(2-diethylaminoethoximino)-5,6-dihydro-dibenzo - [b,e] - azepine-6-one, M.P. 174° C. (Kofler block); melting point of the hydrochloride 222–224° C. $C_{21}H_{25}N_3O_3.HCl$ (403.9): Calc. N, 10.40; OCH₃, 7.68; Cl⁻, 8.78. Found: N, 10.48; OCH₃, 7.82; Cl⁻, 9.52.

(i) Starting from 5-(3-dimethylaminopropyl)-5,6-dihydro-dibenzo-[b,e]-azepine-6,11-dione - 11 - oxime [prepared according to Example 5(a)]: 5-(3-dimethylamino-propyl)-11-(3-dimethylamino-propoximino)-5,6-dihydro-dibenzo-[b,e]-azepine-6-one, B.P. 226–232° C./0.2 mm. Hg. $C_{24}H_{32}N_4O_2$ (408.6): Calc. C, 70.54; H, 7.90; N, 13.71. Found: C, 70.09; H, 7.66; N, 13.91.

EXAMPLE 2

11.9 grams (0.05 mol) of 5,6-dihydro-dibenzo-[b,e·]-azepine-6,11-dione-11-oxime, 13.8 g. (0.1 mol) of anhydrous potassium carbonate and 13.6 g. (0.1 mol) of 2-diethyl-aminoethyl chloride in 200 ml. of acetone are boiled under reflux overnight while stirring. After cooling, the reaction mixture is suction-filtered, the filtrate evaporated in a vacuum, the residue stirred with water and the water-insoluble oil taken up with ether. The ether phase is separated, again washed with water, dried over sodium sulphate and evaporated. The crude 5,6-dihydro-5-(2-diethyl-aminoethyl)- 11 - (2 - diethylamino-ethoximino)dibenzo-[b,e]-azepine-6-one is distilled twice in a vacuum: B.P. 238–242° C./0.2 mm. Hg. $C_{26}H_{36}N_4O_2$ (436.6): Calc. N. 12.83. Found N, 12.70.

The following compounds are also prepared in similar manner, with the use of 0.2 mol of potassium carbonate and 0.2 mol of alkylating agent per 0.05 mol of oxime:

(a) 5-(2-dimethylamino-ethyl)-11-(2 - dimethylamino-ethoximino)-5,6-dihydro-dibenzo-[b,e] - azepine - 6 - one, B.P. 222–226° C./0.25 mm. Hg. $C_{22}H_{28}N_4O_2$ (380.5): Calc. C, 69.44; H, 7.42; N, 14.73. Found: C, 69.64; H, 7.39; N, 14.38.

(b) 5-(3-dimethylamino-propyl)-11-(3-dimethylamino-propoximino)-5,6-dihydro-dibenzo-[b,e]-azepine - 6 - one, B.P. 232–236° C./0.2 mm. Hg which is identical with the compound prepared according to Example 1(i). $C_{24}H_{32}N_4O_2$ (408.6): Calc. C, 70.54; H, 7.90; N, 13.71. Found: C, 70.47; H, 7.49; N, 13.40.

EXAMPLE 3

2.3 grams (0.1 gram atom) of sodium are dissolved in 100 ml. of absolute ethanol, 23.8 g. (0.1 mol) of 5,6-dihydro-dibenzo-[b,e]-azepine - 6,11 - dione - 11 - oxime are added, the reaction mixture is heated until the material is completely dissolved, and the ethanol is drawn off in a vacuum. 100 ml. of absolute benzene are added to the residue and distilled off, the residue is then dissolved in 150 ml. of dimethyl formamide and the solution cooled to 10° C. 14 grams (0.15 mol) of methyl-(2-chloroethyl)-amine which has been liberated from the hydrochloride by means of potassium carbonate, while cooling with ice, and filtered, are then added dropwise to the solution, the reaction mixture is allowed to reach room temperature, while stirring, and is then heated to 100° C. for 1 hour. The dimethyl formamide is distilled off in a vacuum, the residue stirred with water and ether, the ether phase is separated, dried and evaporated. The residue is dissolved in 1 N hydrochloric acid for purification, the product is filtered off from the unreacted starting material and the 11-(2 - methylamino-ethoximino) - 5,6 - dihydro-dibenzo-[b,e]-azepine-6-one is precipitated by the addition of a 1 N sodium hydroxide solution.

The hydrochloride is prepared in acetone with ethereal hydrochloric acid; M.P. 237–239° C. (decomposition). $C_{17}H_{17}N_3O_2 \cdot HCl$ (33.18): Cal. N, 12.66; Cl⁻, 10.60. Found: N, 12.20; Cl⁻, 10.79.

EXAMPLE 4

Methanolic hydrochloric acid is added to 2.2 g. (0.01 mol) of 5,6-dihydro-dibenzo-[b,e]-azepine-6,11-dione and 1.5 ml. of (2-diethylamino-ethoxy)-amine in 10 ml. of methanol until the mixture has a pH of 3–4. The reaction mixture is then boiled under reflux overnight, suction-filtered after cooling (precipitate 0.3 g. azepine-dione) and the filtrate is evaporated in a vacuum. The residue is dissolved in water, filtered, the filtrate is mixed with ether and rendered alkaline while stirring with potassium carbonate. The ether phase is separated, dried and evaporated. The residue is triturated with petroleum ether, the product is filtered off with suction and recrystallized from ether. The 11-(2-diethylamino-ethoximino)-5,6-dihydrodibenzo-[b,e]-azepine-6-one then melts at 151° C. (Kofler block). The substance is identical with the compound described in Example 1 (mixed melting point, infrared spectra). The hydrochloride melts at 232–234° C. (decomposition).

EXAMPLE 4(a)

107 grams (0.48 mol.) of 5,6-dihydro-dibenzo-[b,e]-azepine-6,11-dione, 85 g. (0.48 mol.) of 2-dimethylamino-ethoxy)-amine dihydrochloride and 500 ml. of ethanol are heated under reflux to boiling temperature overnight, while stirring. The reaction mixture is evaporated in a vacuum, the residue dissolved in water, filtered, and the reaction product is precipitated from the filtrate in the form of a viscous mass by the addition of a 2 N sodium hydroxide solution. The aqueous phase is decanted and extracted by shaking with ether. The crude product is triturated with the ether phase whereupon it crystallizes and is filtered off with suction after standing overnight. The ether phase of the filtrate is separated from small amounts of water. The crystal fraction is recrystallized from methanol or acetone; M.P. about 185° C. (Kofler block). The residue after evaporation of the ether phase is dissolved in a little ether, the solution is cooled, triturated and allowed to stand in an ice-bath for some time. After recrystallization from acetone, the resultant precipitate also melts at about 185° C. (Kofler block). By combining the two crystal fractions, dissolving them in acetone and a little methanol and adding ethereal hydrochloric acid, there is obtained a hydrochloride of M.P. 197–200° C., which corresponds in respect of its pharmacological spectrum of activity to the 11-(2-dimethyl-amino-ethoximino)-5,6-dihydro-dibenzo-[b,e] - azepine - 6 - one hydrochloride obtained in Example 1(a). The bases liberated from the hydrochlorides by means of sodium bicarbonate have corresponding infrared and nuclear magnetic resonance spectra.

In the case of the reaction mixture here described it has been possible to separate the reaction product into two substances which can be assumed to be the stereo-isomeric oximes.

For this purpose, the recrystallized crystal fraction first obtained is converted in acetone with ethereal hydrochloric acid into the hydrochloride and this is recrystallized from methanol/acetone; M.P. 206–208° C. The hydrochloride is then dissolved in water, the base is precipitated by means of sodium bicarbonate and recrystallized from acetone; M.P. 192–194° C. (base A). $C_{18}H_{19}N_3O_2$ (345.8): Calc. C, 69.88; H, 6.19; N, 13.58; O, 10.34. Found: C, 69.70; H, 6.29; N, 13.39; O, 10.21.

The recrystallized crystal fraction obtained from the ether phase is converted into the hydrochloride as described above. After recrystallizing twice from methanol/acetone, a hydrochloride of M.P. 215–217° C. is obtained. The base liberated therefrom in the same manner as above melts at 192–194° C. after recrystallization from acetone (base B). $C_{18}H_{19}N_3O_2$ (345.8): Calc. C, 69.88; H, 6.19; N, 13.58. Found: C, 69.51; H, 6.27; N, 13.42.

Compared with the melting points of the pure bases A and B, the mixed sample shows a strong depression. Neither of the bases nor the hydrochlorides can be separated by thin layer chromatography. The infra-red spectra of the bases (in KBr) show slight differences, the nuclear magnetic resonance spectra only differ somewhat in the range of the phenyl protons. The hydrochlorides of the bases A and B also exhibit no substantial differences in respect of their pharmacological activity.

The following Compounds 4(b) to 4(f) are prepared in similar manner as the compounds described in Example 4.

EXAMPLE 4(b)

Starting from 2-chloro-5,6-dihydro-dibenzo-[b,e] - azepine-6,11-dione (M.P. approx. 300° C.): 2-chloro-11-(2-diethylamino-ethoximino)-5,6 - dihydro - dibenzo - [b,e]-azepine-6-one, M.P. 196–198° C.; $C_{20}H_{22}ClN_3O_2$ (371.9): Calc. C, 64.59; H, 5.96; N, 11.30; Cl, 9.53. Found: C, 64.50; H, 6.24; N, 10.95; Cl, 9.24. Melting point of the hydrochloride 258–260° C. (decomposition).

EXAMPLE 4(c)

Starting from 1-methoxy-5,6-dihydro-dibenzo-[b,e]-azepine-6,11-dione (M.P. 254–255° C.): 1-methoxy-11-(2-diethylamino-ethoximino)-5,6-dihydro-dibenzo-[b,e]-azepine-6-one, M.P. (methanol/acetone) 178° C. (Kofler block), which is identical with the compound obtained in Example 1(h).

EXAMPLE 4(d)

Starting from 5-propyl-5,6-dihydro-dibenzo-[b,e]-azepine-6,11-dione (M.P. 138° C.) [Kofler block]: 5-propyl-11-(2-dimethylamino-ethoximino)-5,6-dihydro - dibenzo-[b,e]-azepine-6-one, B.P. 206–208° C./0.3 mm. Hg; the hydrochloride melts at 185–188° C. $C_{21}H_{25}N_3O_2 \cdot HCl$ (387.9): Calc. N, 10.83; Cl⁻, 9.14. Found: N, 10.77; Cl⁻, 9.57.

EXAMPLE 4(e)

Starting from 5-(2-dimethylamino-ethyl)-5,6-dihydro-dibenzo-[b,e]-azepine-6,11-dione (M.P. 115–117° C.), reaction conditions as in Example 4(a): 5-(2-dimethylamino-ethyl)-11-(2-dimethylamino-ethoximino)-5,6-dihydro-dibenzo-[b,e]-azepine-6-one, B.P. 220–224° C./0.3 mm. Hg, which is identical with the compound described in Example 2(a). $C_{22}H_{28}N_4O_2$ (380.5): Calc. C, 69.44; H, 7.42; N, 14.73. Found: C, 69.64; H, 7.61; N, 14.67.

EXAMPLE 4(f)

Starting from 5-(2-diethylamino-ethyl)-5,6-dihydro-dibenzo-[b,e]-azepine-6,11-dione (M.P. 70° C. [Kofler block]): 5-(2-diethylamino-ethyl)-11-(2-diethylamino-ethoximino)-5,6-dihydro-dibenzo-[b,e]-azepine-6-one, B.P. 230–234° C./0.3 mm. Hg, which is identical with the compound obtained in Example 2. $C_{26}H_{36}N_4O_2$ (436.6): Calc. C, 71.53; H, 8.31; N, 12.83. Found: C, 71.43; H, 8.29; N, 12.46.

EXAMPLE 5

9.85 grams (0.0306 mol) of 5-(2-diethylamino-ethyl)-5,6-dihydro-dibenzo-[b,e]-azepine-6,11-dione and 6.4 g. (0.0918 mol) of hydroxylamine hydrochloride are heated in 50 ml. of pyridine at boiling temperature for 4 hours. The pyridine is subsequently distilled off in a vacuum, the residue is mixed with water, a sodium hydroxide solution and ether, the mixture is stirred and the ether phase separated. After drying over sodium sulphate, the ether solution is evaporated. The 5-(2-diethylamino-ethyl)-5,6-dihydro-dibenzo-[b,e]-azepine-6,11-dione-11-oxime crystallizes and is recrystallized from ether or methanol/water; M.P. 156° C. (Kofler block.) $C_{20}H_{23}N_3O_2$ (337.4): Calc. C, 71.19; H, 6.87; N, 12.45. Found: C, 71.45; H, 7.15; N, 12.23.

The following compound is also prepared in similar manner:

(a) Starting from 5-(3-dimethylamino-propyl)-5,6-dihydro-dibenzo-[b,e]-azepine-6,11-dione (melting point 88° C. [Kofler block]): 5-(3-dimethylamino-propyl)-5,6-dihydro-dibenzo-[b,e]-azepine-6,11-dione-11-oxime; melting point of the crude product indistinct at 120° C. (Kofler block). The substance was immediately further processed [Example 1(i)].

EXAMPLE 6

1.2 grams (0.052 gram atom) of sodium are dissolved in 150 ml. of ethanol, 16.85 g. (0.05 mol) of 11-(2-diethylamino-ethoximino)-5,6-dihydro-dibenzo-[b,e]-azepine-6-one (prepared according to Example 1 or 4) and 8.1 g. (0.052 mol) of ethyliodide are added and the reaction mixture is heated at boiling temperature under reflux overnight. The alcohol is subsequently distilled off in a vacuum and the residue is stirred with water, a sodium hydroxide solution and ether, whereby unreacted starting material crystallizes out. The mixture is suction-filtered, the ether phase separated from the filtrate, dried over sodium sulphate and evaporated. The 5-ethyl-11-(2-diethylamino-ethoximino)-5,6-dihydro-dibenzo-[b,e]-azepine-6-one is distilled; B.P. 202–208° C./0.1 mm. Hg. $C_{22}H_{27}N_3O_2$ (365.5): Calc. N, 11.49. Found: N, 11.17.

What is claimed is:

1. A compound selected from the group consisting of a dibenzo-azepine-dione-oxime and its pharmacologically acceptable salts with inorganic and organic acids, said dibenzo-azepine-dione-oxime having the formula:

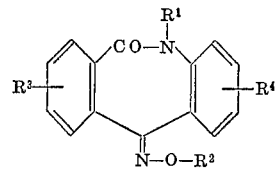

wherein $R^1$ is hydrogen, alkyl of 1 to 4 carbon atoms or a basically substituted alkyl radical —$A^1B^1$, $R^2$ is hydrogen, alkyl of 1 to 4 carbon atoms or a basically substituted alkyl radical —$A^2B^2$, $R^1$ and $R^2$ not being both simultaneously hydrogen and at least one of $R^1$ and $R^2$ being a said basic alkyl radical, $R^3$ and $R^4$ are each hydrogen, halogen, alkyl of 1 to 4 carbon atoms or alkoxy of 1 to 4 carbon atoms, and —$A^1B^1$ and —$A^2B^2$ are identical or different in which $A^1$ and $A^2$ are each branched or straight alkylene of 1 to 6 carbon atoms and $B^1$ and $B^2$ are each selected from the group consisting of alkylamino, dialkylamino, pyrrolidino, piperidino, hexamethylene-imino, morpholino, thiomorpholino, N-alkyl-piperazino and N-(2-hydroalkyl)-piperazino, of which alkyl has 1 to 6 carbon atoms.

2. The dibenzo-azepine-dione-oxime of claim 1 which is 5,6-dihydro-11-(2-diethylamino-ethoximino)-dibenzo-[b,e]-azepine-6-one.

3. The dibenzo-azepine-dione-oxime of claim 1 which is 5,6-dihydro-11-(2-dimethylamino-ethoximino)-dibenzo-[b,e]-azepine-6-one.

4. The dibenzo-azepine-dione-oxime of claim 1 which is 5,6-dihydro-11-(2-piperidino-ethoximino)-dibenzo-[b,e]-azepine-6-one.

5. The dibenzo-azepine-dione-oxime of claim 1 which is 5,6-dihydro-11-(3-dimethylamino-propoximino)-dibenzo-[b,e]-azepine-6-one.

6. The dibenzo-azepine-dione-oxime of claim 1 which is 11-(2-methyl-3-dimethylamino-propoximino)-5,6-dihydro-dibenzo-[b,e]-azepine-6-one.

7. The dibenzo-azepine-dione-oxime of claim 1 which is 11-(2-morpholino-ethoximino)-5,6-dihydro-dibenzo-[b,e]-azepine-6-one.

8. The dibenzo-azepine-dione-oxime of claim 1 which is 11-(3-morpholino-propoximino)-5,6-dihydro-dibenzo-[b,e]-azepine-6-one.

9. The dibenzo-azepine-dione-oxime of claim 1 which is 3-methyl-11-(2-diethylamino-ethoximino)-5,6-dihydro-dibenzo-[b,e]-azepine-6-one.

10. The dibenzo-azepine-dione-oxime of claim 1 which is 1-methoxy-11-(2-diethylamino-ethoximino)-5,6-dihydro-dibenzo-[b,e]-azepine-6-one.

11. The dibenzo-azepine-dione-oxime of claim 1 which is 5-(3-dimethylamino-propyl)-11-(3-dimethylamino-propoximino)-5,6-dihydro-dibenzo-[b,e]-azepine-6-one.

12. The dibenzo-azepine-dione-oxime of claim 1 which is 5,6-dihydro-5-(2-diethyl-aminoethyl)-11-(2-diethylamino-ethoximino)-dibenzo-[b,e]-azepine-6-one.

13. The dibenzo-azepine-dione-oxime of claim 1 which is 5-(2-dimethylamino-ethyl)-11-(2-dimethylamino-ethoximino)-5,6-dihydro-dibenzo-[b,e]-azepine-6-one.

14. The dibenzo-azepine-dione-oxime of claim 1 which is 11 - (2 - methylamino-ethoximino)-5,6-dihydro-dibenzo-[b,e]-azepine-6-one.

15. The dibenzo-azepine-dione-oxime of claim 1 which is 5 - (2 - diethylamino-ethyl)-5,6-dihydro-dibenzo-[b,e]-azepine-6,11-dione-11-oxime.

16. The dibenzo-azepine-dione-oxime of claim 1 which is 5 - (3 - dimethylamino-propyl)-5,6-dihydro-dibenzo-[b,e]-azepine-6,11-dione-11-oxime.

17. The dibenzo-azepine-dione-oxime of claim 1 which is 5 - ethyl - 11-(2-diethylamino-ethoximino)-5,6-dihydro-dibenzo-[b,e]-azepine-6-one.

References Cited

UNITED STATES PATENTS

| 2,973,354 | 2/1961 | Werner | 260—239.2 |
| 3,084,155 | 4/1963 | Winthrop et al. | 260—239.3 |

HENRY R. JILES, *Primary Examiner.*

R. T. BOND, *Assistant Examiner.*

U.S. Cl. X.R.

260—999